United States Patent
Farrell et al.

(10) Patent No.: US 10,122,675 B2
(45) Date of Patent: *Nov. 6, 2018

(54) RETROSPECTIVE CHANGING OF PREVIOUSLY SENT MESSAGES

(71) Applicant: International Business Machines Corporation, Armonk, NY (US)

(72) Inventors: Colm Farrell, Closilla (IE); Liam Harpur, Skerries (IE); Patrick Joseph O'Sullivan, Ballsbridge (IE); Fred Raguillat, Dunboyne (IE); Hema Srikanth, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 19 days.

This patent is subject to a terminal disclaimer.

(21) Appl. No.: 15/332,591

(22) Filed: Oct. 24, 2016

(65) Prior Publication Data

US 2017/0041281 A1  Feb. 9, 2017

Related U.S. Application Data

(63) Continuation of application No. 12/546,318, filed on Aug. 24, 2009, now Pat. No. 9,477,947.

(51) Int. Cl.
*G06F 15/16* (2006.01)
*H04L 12/58* (2006.01)
*G06Q 10/00* (2012.01)
*G06Q 10/10* (2012.01)

(52) U.S. Cl.
CPC .......... *H04L 51/34* (2013.01); *G06Q 10/00* (2013.01); *G06Q 10/107* (2013.01); *H04L 51/04* (2013.01); *H04L 51/063* (2013.01); *H04L 51/22* (2013.01)

(58) Field of Classification Search
CPC ........................................... H04L 51/34
USPC ............................................ 709/204, 205
See application file for complete search history.

(56) References Cited

U.S. PATENT DOCUMENTS

| | | |
|---|---|---|
| 4,887,292 A | 12/1989 | Barrett et al. |
| 4,914,732 A | 4/1990 | Henderson et al. |
| 4,916,443 A | 4/1990 | Barrett et al. |
| 4,947,163 A | 8/1990 | Henderson et al. |
| 5,220,604 A | 6/1993 | Gasser et al. |
| 5,247,575 A | 9/1993 | Sprague et al. |
| 5,262,942 A | 11/1993 | Earle |
| 5,305,197 A | 4/1994 | Axler et al. |
| 5,625,692 A | 1/1997 | Herzberg et al. |

(Continued)

OTHER PUBLICATIONS

"U.S. Appl. No. 12/546,318 Final Office Action", dated Oct. 9, 2013, 9 Pages.

(Continued)

*Primary Examiner* — Karen Tang
(74) *Attorney, Agent, or Firm* — DeLizio Law, PLLC

(57) ABSTRACT

Functionality can be implemented in email applications to allow sent messages to be updated, even if the sent messages have been read. When a request to update a sent message is received, a message update unit can update information in the message according to the notification. The message update unit can notify a recipient that the message was updated, and can indicate changed information in the sent message. The message update unit can also determine if the sent message has been forwarded, and forward the update notification to other recipients.

12 Claims, 6 Drawing Sheets

(56) References Cited

U.S. PATENT DOCUMENTS

| | | | |
|---|---|---|---|
| 5,710,814 | A | 1/1998 | Klemba et al. |
| 5,745,574 | A | 4/1998 | Muftic |
| 5,819,238 | A | 10/1998 | Fernholz |
| 5,870,548 | A * | 2/1999 | Nielsen ............. G06Q 10/107 379/93.24 |
| 5,963,642 | A | 10/1999 | Goldstein |
| 5,966,351 | A * | 10/1999 | Carleton ............. H04M 3/533 369/29.01 |
| 6,028,938 | A | 2/2000 | Malkin et al. |
| 6,055,413 | A | 4/2000 | Morse et al. |
| 6,078,990 | A | 6/2000 | Frazier |
| 6,081,508 | A | 6/2000 | West et al. |
| 6,081,899 | A | 6/2000 | Byrd |
| 6,105,122 | A | 8/2000 | Muller et al. |
| 6,148,349 | A | 11/2000 | Chow et al. |
| 6,178,504 | B1 | 1/2001 | Fieres et al. |
| 6,185,612 | B1 | 2/2001 | Jensen et al. |
| 6,189,045 | B1 | 2/2001 | O'Shea et al. |
| 6,195,751 | B1 | 2/2001 | Caronni et al. |
| 6,212,636 | B1 | 4/2001 | Boyle et al. |
| 6,226,743 | B1 | 5/2001 | Naor et al. |
| 6,247,077 | B1 | 6/2001 | Muller et al. |
| 6,256,740 | B1 | 7/2001 | Muller et al. |
| 6,275,934 | B1 | 8/2001 | Novicov et al. |
| 6,324,571 | B1 | 11/2001 | Hacherl |
| 6,363,478 | B1 | 3/2002 | Lambert et al. |
| 6,372,974 | B1 | 4/2002 | Gross et al. |
| 6,378,912 | B1 | 4/2002 | Condon et al. |
| 6,401,239 | B1 | 6/2002 | Miron |
| 6,418,413 | B2 | 7/2002 | Demarcken et al. |
| 6,457,053 | B1 | 9/2002 | Satagopan et al. |
| 6,490,614 | B1 | 12/2002 | Shaffer |
| 6,526,273 | B1 | 2/2003 | Link, II et al. |
| 6,538,996 | B1 | 3/2003 | West et al. |
| 6,539,480 | B1 | 3/2003 | Drews |
| 6,594,698 | B1 | 7/2003 | Chow et al. |
| 6,598,167 | B2 | 7/2003 | Devine et al. |
| 6,606,708 | B1 | 8/2003 | Devine et al. |
| 6,615,258 | B1 | 9/2003 | Barry et al. |
| 6,640,230 | B1 | 10/2003 | Alexander et al. |
| 6,643,289 | B1 | 11/2003 | Natanson et al. |
| 6,690,659 | B1 | 2/2004 | Ahmed et al. |
| 6,711,632 | B1 | 3/2004 | Chow et al. |
| 6,714,778 | B2 | 3/2004 | Nykanen et al. |
| 6,735,202 | B1 | 5/2004 | Ahmed et al. |
| 6,754,696 | B1 | 6/2004 | Kamath et al. |
| 6,765,896 | B1 | 7/2004 | Ahmed et al. |
| 6,769,000 | B1 | 7/2004 | Akhtar et al. |
| 6,784,786 | B1 | 8/2004 | Sumner |
| 6,816,900 | B1 | 11/2004 | Vogel et al. |
| 6,822,553 | B1 | 11/2004 | Henderson et al. |
| 6,823,454 | B1 | 11/2004 | Hind et al. |
| 6,826,690 | B1 | 11/2004 | Hind et al. |
| 6,839,841 | B1 | 1/2005 | Medvinsky et al. |
| 6,856,812 | B1 | 2/2005 | Budka et al. |
| 6,925,562 | B2 | 8/2005 | Gulcu et al. |
| 6,968,571 | B2 | 11/2005 | Devine et al. |
| 6,986,038 | B1 | 1/2006 | Leah et al. |
| 6,986,039 | B1 | 1/2006 | Leah et al. |
| 7,016,666 | B2 | 3/2006 | Lauper et al. |
| 7,079,499 | B1 | 7/2006 | Akhtar et al. |
| 7,089,428 | B2 | 8/2006 | Farley et al. |
| 7,096,498 | B2 | 8/2006 | Judge |
| 7,114,083 | B2 | 9/2006 | Devine et al. |
| 7,114,180 | B1 | 9/2006 | Decaprio |
| 7,123,900 | B2 | 10/2006 | Brown et al. |
| 7,124,289 | B1 | 10/2006 | Suorsa |
| 7,127,328 | B2 | 10/2006 | Ransom |
| 7,131,123 | B2 | 10/2006 | Suorsa et al. |
| 7,143,165 | B2 | 11/2006 | Vogel et al. |
| 7,152,049 | B2 | 12/2006 | Ryan, Jr. |
| 7,152,109 | B2 | 12/2006 | Suorsa et al. |
| 7,162,512 | B1 | 1/2007 | Amit et al. |
| 7,171,202 | B2 | 1/2007 | Chen et al. |
| 7,188,003 | B2 | 3/2007 | Ransom et al. |
| 7,191,939 | B2 | 3/2007 | Beck et al. |
| 7,203,753 | B2 | 4/2007 | Yeager et al. |
| 7,203,908 | B1 | 4/2007 | Nakajima et al. |
| 7,213,047 | B2 | 5/2007 | Yeager et al. |
| 7,216,085 | B1 | 5/2007 | Wertheimer et al. |
| 7,222,187 | B2 | 5/2007 | Yeager et al. |
| 7,225,249 | B1 | 5/2007 | Barry et al. |
| 7,249,373 | B2 | 7/2007 | Shewchuk et al. |
| 7,263,607 | B2 | 8/2007 | Ingerman et al. |
| 7,272,662 | B2 | 9/2007 | Chesnais et al. |
| 7,272,782 | B2 | 9/2007 | Sneh |
| 7,275,102 | B2 | 9/2007 | Yeager et al. |
| 7,305,627 | B2 | 12/2007 | Tannenbaum |
| 7,590,693 | B1 | 9/2009 | Chan et al. |
| 7,624,146 | B1 | 11/2009 | Brogne et al. |
| 7,970,834 | B2 | 6/2011 | Daniels et al. |
| 8,050,983 | B1 | 11/2011 | Eakin et al. |
| 8,073,122 | B2 | 12/2011 | Kay et al. |
| 2002/0023138 | A1 * | 2/2002 | Quine ............. G06Q 10/107 709/206 |
| 2002/0035635 | A1 | 3/2002 | Holden et al. |
| 2002/0059379 | A1 | 5/2002 | Harvey et al. |
| 2002/0099777 | A1 | 7/2002 | Gupta |
| 2002/0194278 | A1 | 12/2002 | Golan |
| 2003/0086438 | A1 | 5/2003 | Laumen et al. |
| 2003/0088633 | A1 * | 5/2003 | Chiu ............. H04L 29/06 709/206 |
| 2003/0115279 | A1 | 6/2003 | Quine et al. |
| 2004/0230642 | A1 | 11/2004 | Collet et al. |
| 2005/0039048 | A1 | 2/2005 | Tosey |
| 2005/0278413 | A1 | 12/2005 | Tannenbaum |
| 2007/0005713 | A1 * | 1/2007 | LeVasseur ............. G06Q 10/107 709/206 |
| 2007/0005717 | A1 | 1/2007 | Levasseur et al. |
| 2007/0106730 | A1 * | 5/2007 | Bhakta ............. G06Q 10/107 709/206 |
| 2007/0106731 | A1 | 5/2007 | Bhakta et al. |
| 2007/0244977 | A1 * | 10/2007 | Atkins ............. G06Q 10/107 709/206 |
| 2008/0005253 | A1 | 1/2008 | Vincent |
| 2008/0088428 | A1 | 4/2008 | Pitre et al. |
| 2008/0098072 | A1 | 4/2008 | Jones et al. |
| 2008/0155026 | A1 | 6/2008 | Daniels-Farrar et al. |
| 2008/0317228 | A1 | 12/2008 | Kay et al. |
| 2009/0138820 | A1 | 5/2009 | Lockhart et al. |
| 2009/0216849 | A1 | 8/2009 | Vincent |
| 2009/0282347 | A1 | 11/2009 | Abernethy et al. |
| 2010/0138507 | A1 | 6/2010 | Sun et al. |
| 2010/0304766 | A1 | 12/2010 | Goyal |
| 2011/0047222 | A1 | 2/2011 | Farrell et al. |
| 2016/0269440 | A1 * | 9/2016 | Hartman ............. H04L 63/1483 |
| 2017/0193234 | A1 * | 7/2017 | LeVasseur ............. G06F 21/602 |

OTHER PUBLICATIONS

"U.S. Appl. No. 12/546,318 Office Action", dated Feb. 13, 2012, 14 pages.

"U.S. Appl. No. 12/546,318 Office Action", dated Jun. 28, 2013, 12 Pages.

* cited by examiner

RETROSPECTIVE CHANGING OF PREVIOUSLY SENT MESSAGES

RELATED APPLICATIONS

This application is a Continuation of, and claims the priority benefit of, U.S. application Ser. No. 12/546,318 filed Aug. 24, 2009.

BACKGROUND

Embodiments of the inventive subject matter generally relate to the field of electronic communications, and, more particularly, to retrospective changing of previously sent messages.

Mistakes such as forgetting to attach files, making typos, and clicking send too soon are common in electronic messages. Senders usually discover their mistakes after messages have already been sent. Some email applications (e.g., IBM® Lotus Notes, Microsoft® Office, etc.) allow sent messages to be recalled if the messages have not been read. Recalled messages are deleted from recipients' inboxes. Senders have to send additional messages to correct mistakes. If a message cannot be recalled, a recipient will have two versions of the message in their inbox.

SUMMARY

Embodiments include a computer program product comprising a tangible machine-readable storage medium having computer usable program code configured to receive a request to update a previously sent message. If the previously sent message can be updated, changes to be applied to the previously sent message can be determined based on the request. In some embodiments, the previously sent message can be updated based on the changes. A recipient can be notified that the previously sent message has been updated. If the previously sent message has been forwarded to a second recipient, the request can be forwarded to the second recipient.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes example systems, methods, techniques, instruction sequences, and computer program products that embody techniques of the present inventive subject matter. However, it is understood that the described embodiments may be practiced without these specific details. For instance, although examples refer to email, embodiments can be implemented in instant messaging, social networking, etc. In other instances, well-known instruction instances, protocols, structures, and techniques have not been shown in detail in order not to obfuscate the description.

Having multiple versions of a message in a recipient's inbox may lead to confusion. For example, the recipient received an email about a meeting that specifies an incorrect date. After the recipient read the email, the recipient received another email correcting the date. If the recipient does not delete the incorrect email, the recipient may accidentally use the incorrect email to reference the date and attend the meeting on the wrong day. Functionality can be implemented in email applications to allow sent messages to be updated, even if the sent messages have been read. When a request to update a sent message is received, a message update unit can update information in the message according to the notification. The message update unit can notify a recipient that the message was updated, and can indicate changed information in the sent message. The message update unit can also determine if the sent message has been forwarded, and forward the update notification to other recipients.

Figure 1:
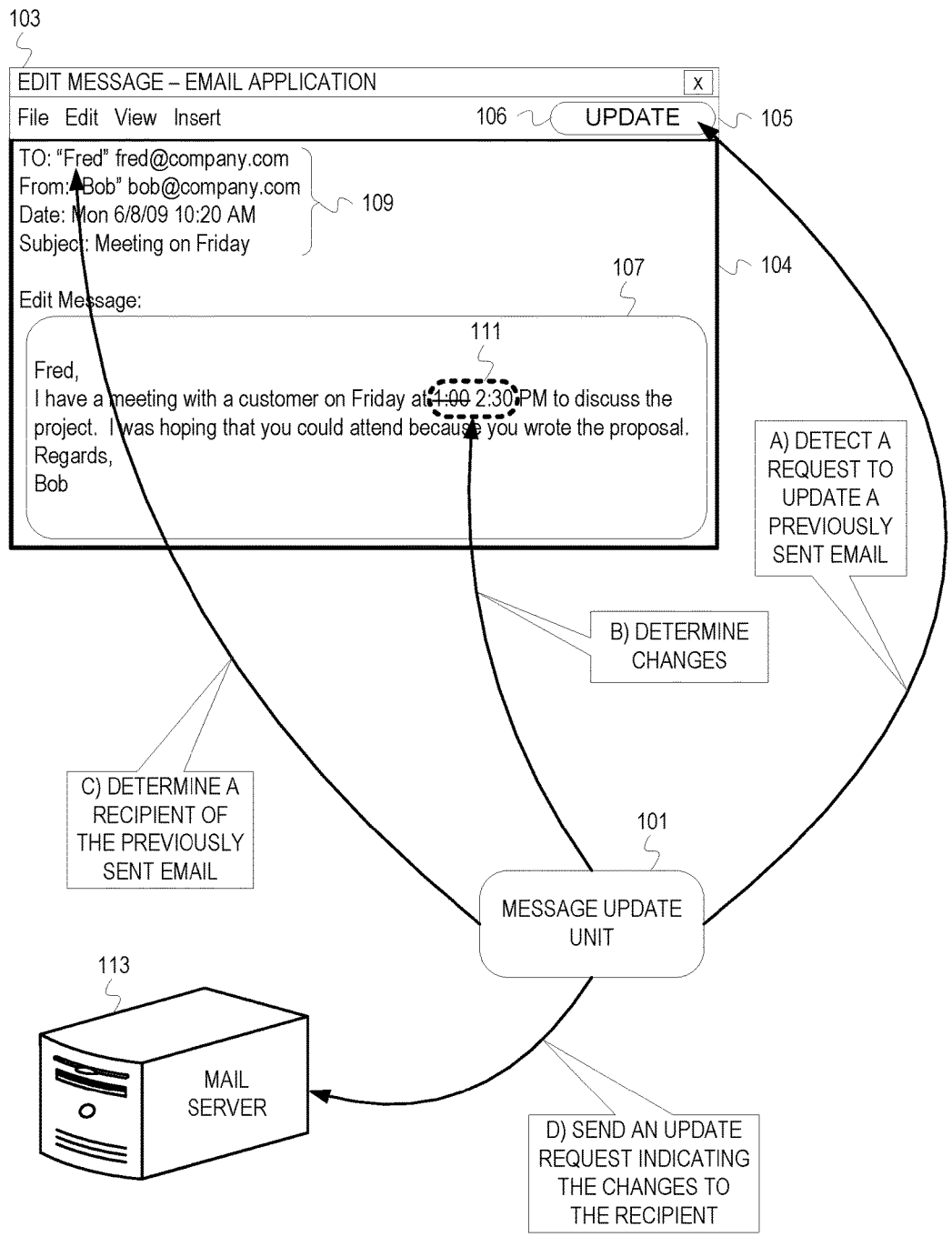
FIG. 1 is an example conceptual diagram of sending an update notification for a previously sent email.

FIG. 1 is an example conceptual diagram of sending an update notification for a previously sent email. A previously sent email message 104 is displayed in an edit message window 103 of an email application. An update button 106 is available in a toolbar 105 of the edit message window 103. The previously sent email message 104 comprises a header 109 and a body 107. FIG. 1 shows dataflow and operations occurring in stages A-D.

At stage A, a message update unit 101 detects a request to update the previously sent email message 104. In this example, the message update unit 101 detects a click on the update button 106. The message update unit 101 may be integrated in the email application, a standalone application running on a server, etc.

At stage B, the message update unit 101 determines changes made to the previously sent email 104. In this example, the message update unit 101 determines that text 111 representing a time has been changed in the previously sent email 104.

At stage C, the message update unit 101 determines a recipient of the previously sent email based on the header 109. In this example, the recipient is Fred, fred@company.com.

At stage D, the message update unit 101 sends an update request indicating the changes to the recipient via the email server 113. In this example, the text 111 was changed from "1:00" to "2:30." The update request can include the entire previously sent email 104 with indications of the changes. For example, the update request includes the email body 107 with the changes to text 111 indicated by tags. The update request may not include the entire email text. For example, the update request includes a snippet of original text, changes made to the snippet, and a location of the text. In addition, the update request can include an identifier of the previously sent message, and a date stamp, etc.

Figure 2:
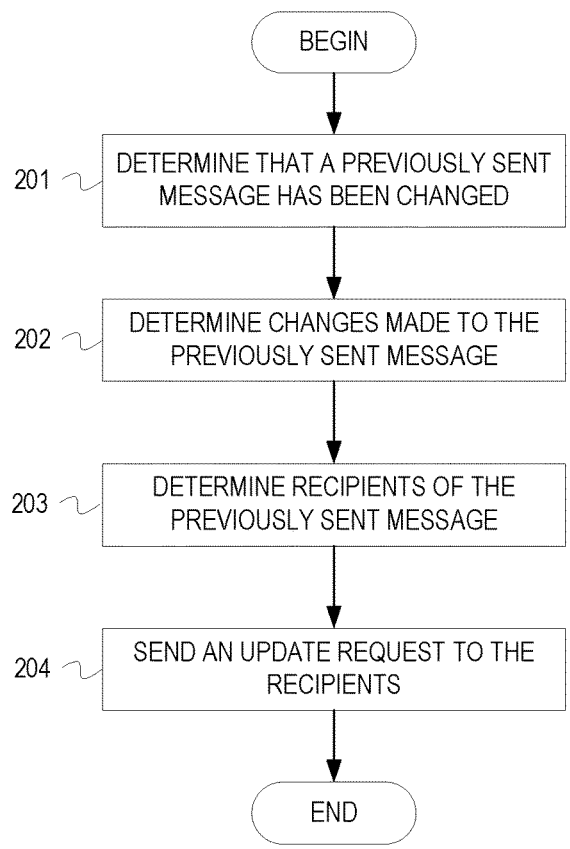
FIG. 2 depicts a flowchart of example operations for sending an update notification for a previously sent email.

FIG. 2 depicts a flowchart of example operations for sending an update notification for a previously sent email. Flow begins at block 201, where a message update unit determines that a previously sent message has been changed. Examples of previously sent messages include emails, instant messages, social networking posts, etc. Flow continues at block 202.

At block 202, the message update unit determines changes made to the previously sent message. For example, the message update unit determines that an attachment has been added to the previously sent message. As another example, the message update unit determines that priority of the previously sent message has been changed. Changes may be determined based on comparing an original version of the previously sent email with a changed version of the previously sent email. Policies may govern changes that can be made to a previously sent message. The policies may be based on sender preferences, recipient preferences, company policies, etc. For example, policies may allow format changes to a body of a previously sent email but may restrict changes text. As another example, a policy may allow changes to body text and a subject, but not allow addition or removal of recipients. Flow continues at block 203.

At block 203, the message update unit determines recipients of the previously sent message. The message update unit can determine the recipients based on the previously sent message's header. Flow continues at block 204.

At block 204, the message update unit sends an update request to the recipients and flow ends. The update request can be sent to the recipients via a mail server.

Figure 3:
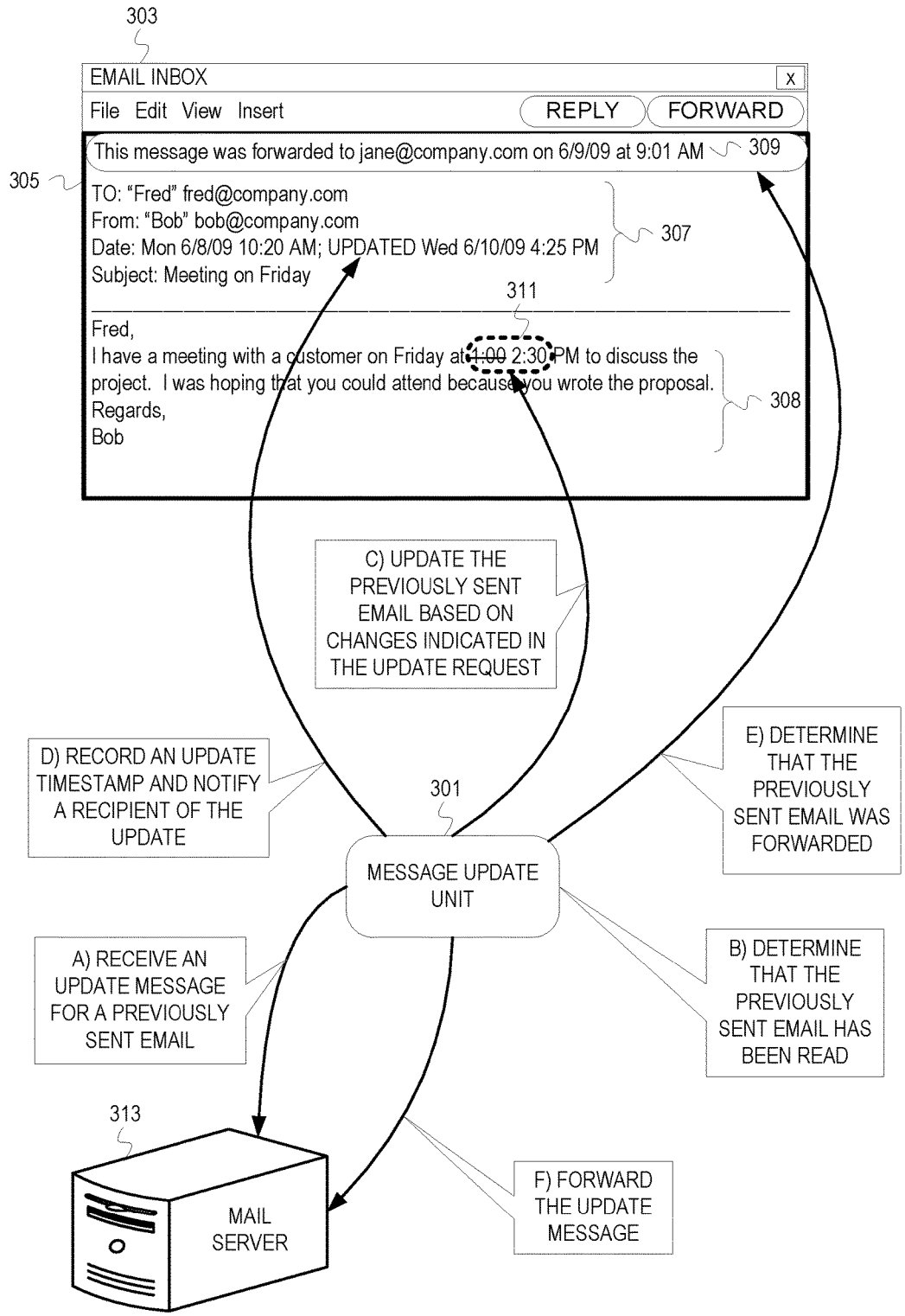
FIG. 3 is an example conceptual diagram of updating an already sent email.

FIG. 3 is an example conceptual diagram of updating an already sent email. A previously sent email message 305 is displayed in an email inbox 303. The previously sent email message 305 comprises a header 307 and a body 308. An indication 309 that the previously sent email was forwarded is displayed above the previously sent email 305. FIG. 3 shows dataflow and operations occurring in stages A-F.

At stage A, a message update unit 301 receives an update message for the previously sent email 305 from a mail server 313. The update message can be matched to the previously sent email 305 based on an identifier in the update message.

At stage B, the message update unit 301 determines that the previously sent email has been read. For example, the message update unit 301 determines that the previously sent email's status is "opened."

At stage C, the message update unit 301 updates the previously sent email based on changes indicated in the update request. In this example, the message update unit 301 changes text 311 to "2:30" from "1:00" in the body 308. Updates may be applied to previously sent emails based on policies. For example, a policy does not allow updates to previously sent messages unless an update request was sent within 30 minutes of a previously sent email. Policies may indicate which parts (e.g., subject, body, attachments, etc.) of previously sent messages may be updated.

At stage D, the message update unit 301 records an update timestamp in the header 307 and notifies a recipient of the update. For example, the message update unit highlights the previously sent email 305 in the recipient's inbox to notify the recipient that an update was received for the previously sent email 305. As another example, the message update unit 301 notifies the recipient of the update by displaying a pop-up dialog box.

At stage E, the message update unit 301 determines that the previously sent email 305 was forwarded to additional recipients. In this example, the previously sent email 305 was forwarded to jane@company.com. The message update unit 301 can determine that the previously sent email 305 was forwarded based on an indication stored on the recipient's computer. For example, the message update unit examines the previously sent email's 305 metadata to determine if the message was forwarded. The message update unit 301 can determine that the previously sent email 305 was forwarded based on an indication stored on a mail server. For example, the message update unit 301 accesses information indicating additional recipients stored in a database based on an identifier of the previously sent message.

At stage F, the message update unit 301 forwards the update message to the additional recipients via the mail server 313.

Figure 4:
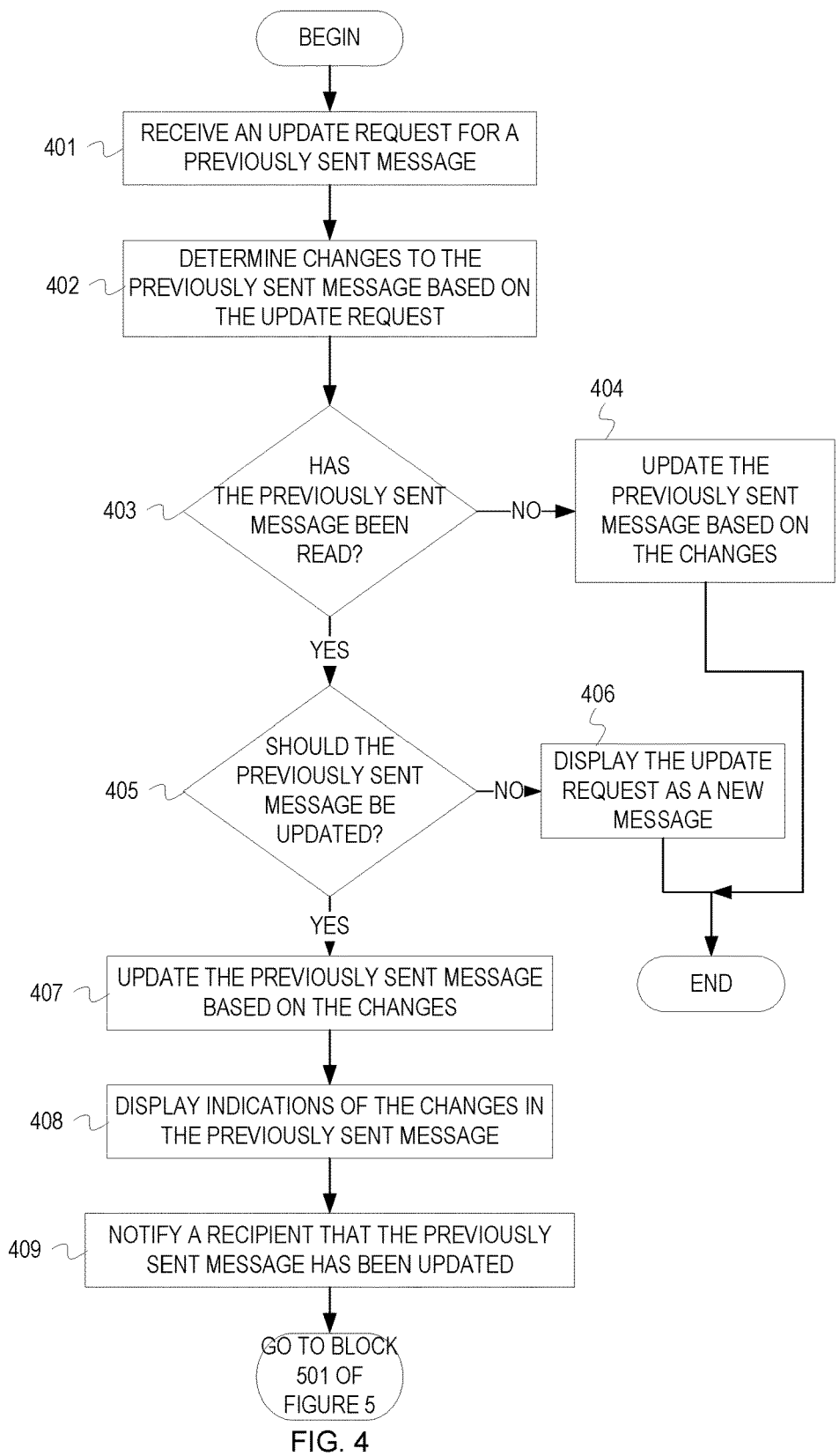
FIGS. 4 and 5 depict a flowchart of example operations for updating a previously sent email.
Figure 5:
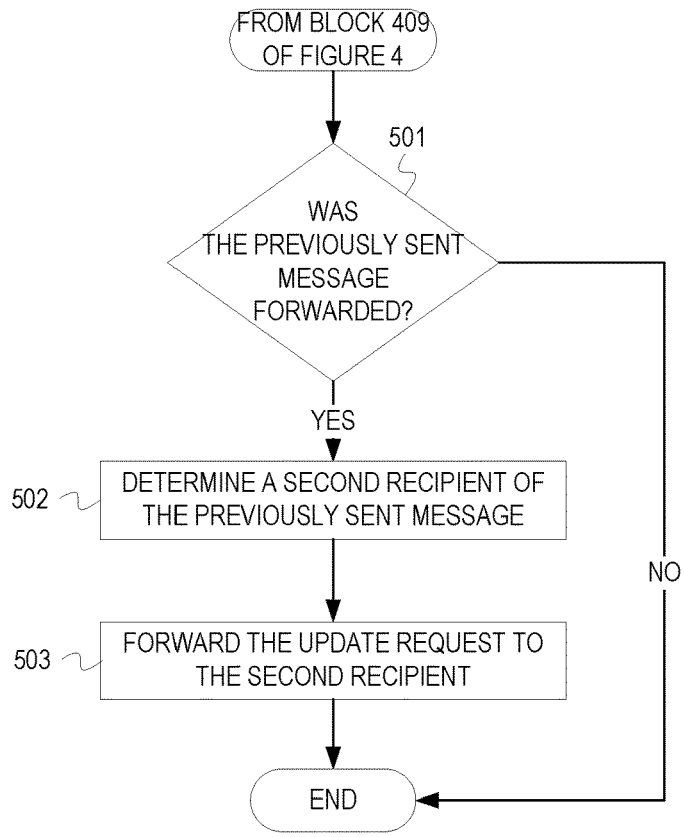

FIGS. 4 and 5 depict a flowchart of example operations for updating a previously sent email. Flow begins at block 401, where a message update unit receives an update request for a previously sent message. Flow continues at block 402.

At block 402, the message update unit determines changes to the previously sent message based on the update request. For example, the message update unit determines the changes based on tagged text in the update request. Flow continues at block 403.

At block 403, the message update unit determines if the previously sent message has been read. For example, the message update unit determines if the previously sent message was opened. If the previously sent message has been read, flow continues at block 404. If the previously sent message has not been read, flow continues at block 405.

At block 404, the message update unit updates the previously sent email based on the changes and flow ends. The update can be applied to the previously sent email based on preferences. For example, preferences indication that updates should be transparent so that the recipient does not know that the update has occurred. As another example, preferences indicated that changes made to the previously sent email should be marked.

At block 405, the message update unit determines if the message should be updated. The message update unit can determine if the message should be updated based on policies. For example, a policy indicates that changes should be automatically allowed if previously sent message's sender is a superior of the recipient. As another example, a policy indicates that a recipient should be prompted to accept or reject the changes if a recipient is an employee of a sender. If the message should not be updated, flow continues at block 406. If the message should be updated, flow continues at block 407.

At block 406, the message update unit displays the update request as a new message in a recipient's inbox and flow ends. The update request can be displayed as a new message if the recipient's email application does not support updates of previously sent messages.

At block 407, the message update unit updates the previously sent message based on the changes. For example, the message update unit adds an attachment to the previously sent message. Flow continues at block 408.

At block 408, the message update unit displays indications of the changes in the previously sent message. For example, removed text is indicated by a strikethrough and added text may is underlined and color-coded. A recipient may wish to accept the changes to make text more readable. If a recipient accepts the changes, the indications may be removed. Flow continues at block 409.

At block 409, the message update unit notifies a recipient that the previously sent message has been updated. For example, the message update unit moves the previously sent email to the top of the recipient's inbox based on a timestamp in the update request. Flow continues at block 501 of FIG. 5.

In some embodiments, the message unit can receive a second request to update a second previously sent message. The message update unit can determine that the second previously sent message cannot be updated; and display the second request as a new message in an inbox of the recipient.

FIG. 5 depicts a flowchart of example operations for updating a previously sent email. Flow continues at block 501 from block 409 of FIG. 4, where the message update unit determines if the message was forwarded. For example, the message update unit determines that the message was updated based on an indication stored on a mail server. If the message was forwarded, flow continues at block 502. If the message was not forwarded, flow ends.

At block 502, the message update unit determines a second recipient of the previously sent message. For example, the message update unit determines the second recipient based on metadata indicating the second recipient's email. Flow continues at block 503.

At block 503, the message update unit forwards the update request to the second recipient and flow ends. The message update unit can notify the previously sent message's sender of the forward. The sender can specify whether the update request should be forwarded. The message update unit can also ask the sender if the update should be forwarded before forwarding the update.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition to tangible machine-readable storage media, embodiments may be embodied in an electrical, optical, acoustical or other form of propagated signal (e.g., carrier waves, infrared signals, digital signals, etc.), or wireline, wireless, or other communications medium. As used herein, a propagated signal is not a tangible machine-readable storage medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
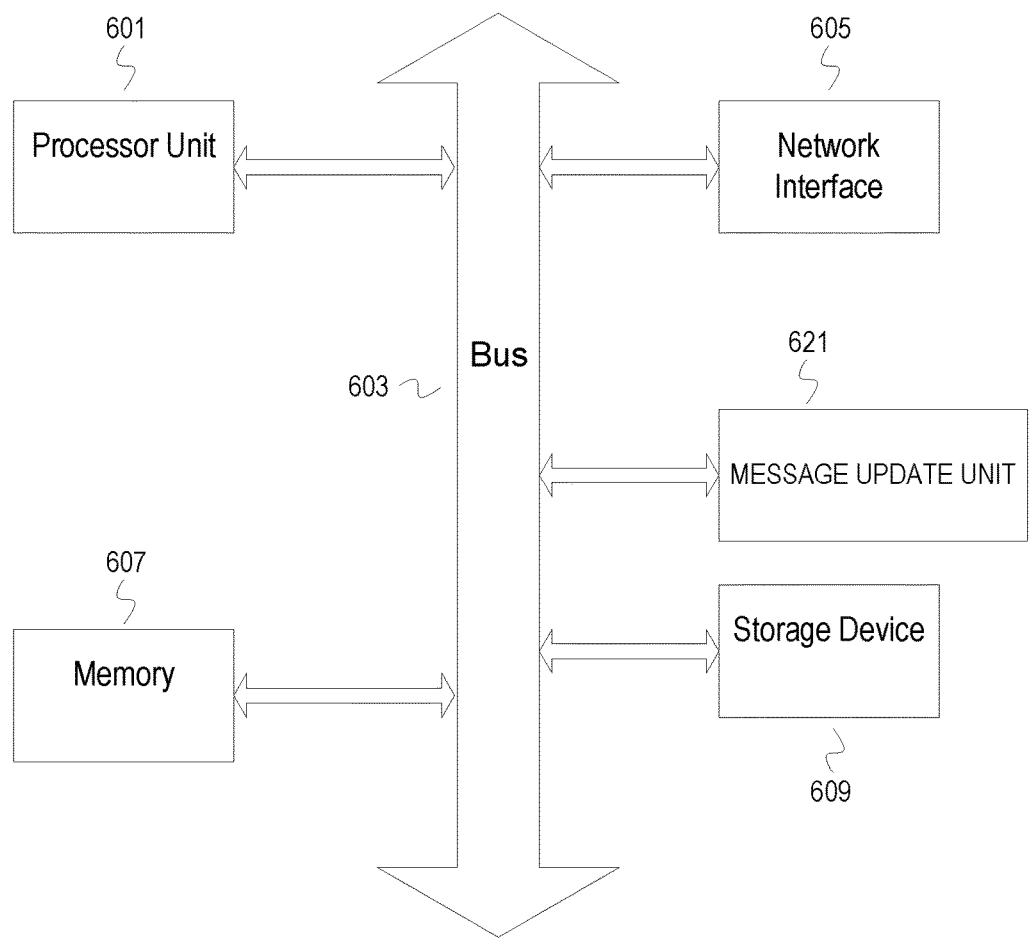
FIG. 6 depicts an example computer system.

FIG. 6 depicts an example computer system. A computer system includes a processor unit 601 (possibly including multiple processors, multiple cores, multiple nodes, and/or implementing multi-threading, etc.). The computer system includes memory 607. The memory 607 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computer system also includes a bus 603 (e.g., PCI, ISA, PCI-Express, HyperTransport®, InfiniBand®, NuBus, etc.), a network interface 605 (e.g., an ATM interface, an Ethernet interface, a Frame Relay interface, SONET interface, wireless interface, etc.), and a storage device(s) 609 (e.g., optical storage, magnetic storage, etc.). The computer system also includes a message update unit 621. The message update unit updates previously sent messages based on changes indicated in an update request, notifies a recipient that the previously sent message has been updated, and displays indications of the changes. The message update unit 621 also determines if the previously sent message was forwarded to additional recipients and forwards the update request to the additional recipients. Any one of these functionalities may be partially (or entirely) implemented in hardware and/or on the processing unit 601. For example, the functionality may be implemented with an application specific integrated circuit, in logic implemented in the processing unit 601, in a co-processor on a peripheral device or card, etc. Further, realizations may include fewer or additional components not illustrated in FIG. 6 (e.g., video cards, audio cards, additional network interfaces, peripheral devices, etc.). The processor unit 601, the storage device(s) 609, and the network interface 605 are coupled to the bus 603. Although illustrated as being coupled to the bus 603, the memory 607 may be coupled to the processor unit 601.

While the embodiments are described with reference to various implementations and exploitations, it will be understood that these embodiments are illustrative and that the scope of the inventive subject matter is not limited to them. In general, techniques for retrospective change of previously sent messages as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the example configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A computer program product for changing previously sent messages, the computer program product comprising:
 a tangible machine-readable storage medium having computer usable program code embodied therewith, the computer usable program code comprising:

program code to receive a request to update a previously sent message including original text;

program code to determine changes to the previously sent message based on the request;

program code to update the previously sent message to include markings indicating the changes and the original text;

program code to notify a recipient that the previously sent message has been updated;

program code to determine that the previously sent message has been forwarded to a second recipient; and program code to forward the request to the second recipient.

2. The computer program product of claim 1, wherein the computer usable program code further includes program code to determine the previously sent message based on an identifier in the request responsive to receiving the request to update the previously sent message.

3. The computer program product of claim 1, wherein the program code to determine that the previously sent message can be updated is based, at least in part, on policies.

4. The computer program product of claim 3, wherein the policies govern changes allowed to the sent message.

5. The computer program product of claim 3, wherein the policies comprise restrictions to changes to message text of the sent message.

6. The computer program product of claim 3, wherein the policies comprise restrictions to changes to a subject of the sent message.

7. The computer program product of claim 3, wherein the policies comprise restrictions on adding recipients.

8. The computer program product of claim 3, wherein the policies comprise removing recipients.

9. The computer program product of claim 1, wherein the program code to notify the recipient that the previously sent message has been updated comprises:

program code to determine that the previously sent message was opened; and program code to move the previously sent message to an inbox position based, at least in part, on a timestamp of the request instead of a timestamp of the previously sent message.

10. The computer program product of claim 1, wherein the computer usable program code further comprises:

program code to receive a second request to update a second previously sent message;

program code to determine that the second previously sent message cannot be updated; and program code to display the second request as a new message in an inbox of the recipient.

11. The computer program product of claim 1, wherein the computer usable program code further includes:

program code to determine that changes were made to a second previously sent message;

program code to determine recipients of the second previously sent message; and program code to send, to the recipients, a second request to update the previously sent message based on the changes made to the second previously sent message.

12. The computer program product of claim 11, wherein the computer usable program code to determine that changes were made to the second previously sent message comprises program code to compare the second previously sent message with an original copy of the second previously sent message.

* * * * *